3,669,541
DIRECT DISPLAY OF LIGHT IMAGES WITH
PICOSECOND RESOLUTION
Michel Albert Duguay, Summit, N.J., assignor to Bell
Telephone Laboratories, Incorporated, Murray Hill and
Berkeley Heights, N.J.
Filed June 19, 1970, Ser. No. 47,838
Int. Cl. G01c 3/08; G02f 1/28
U.S. Cl. 356—5                                   18 Claims

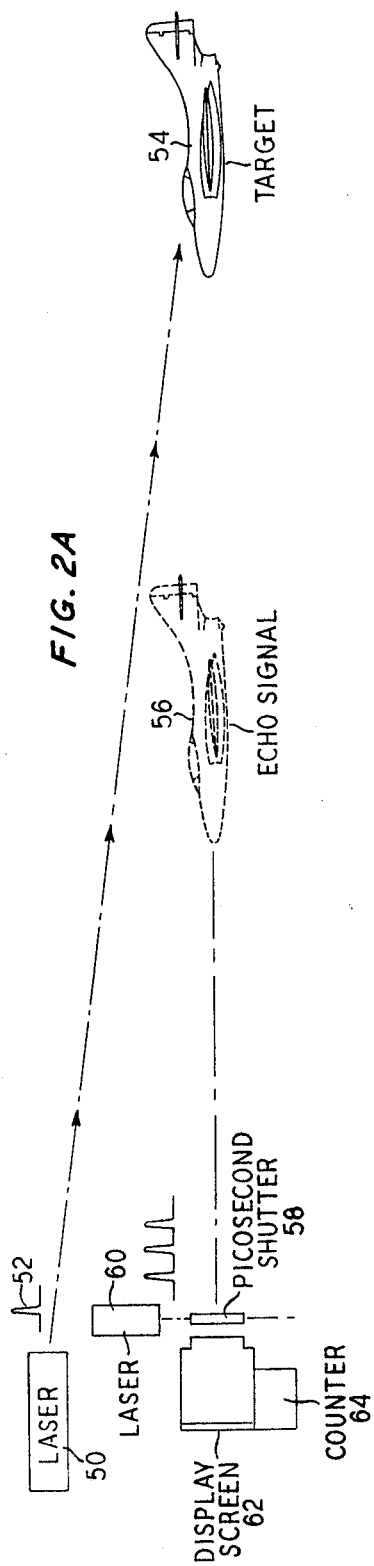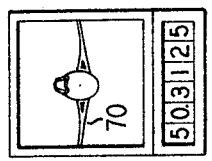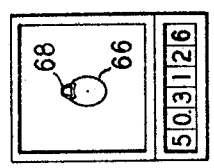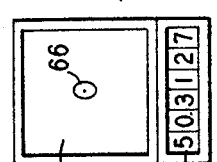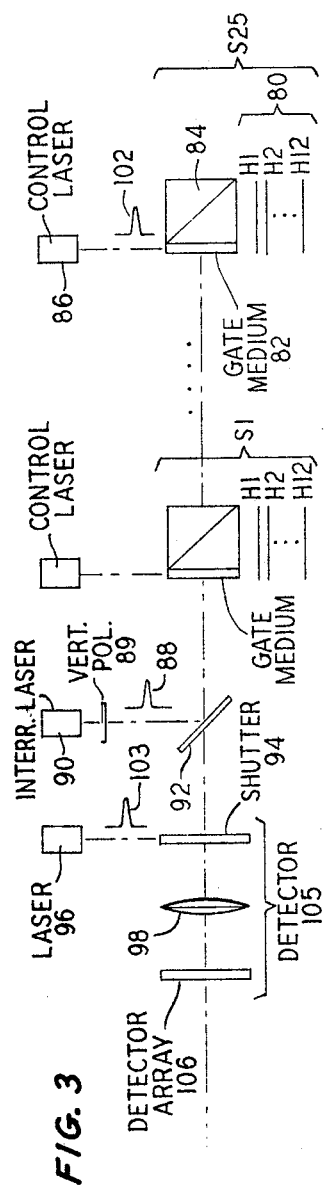

ABSTRACT OF THE DISCLOSURE

A light image such as a picosecond optical pulse generated by a laser or an optical echo signal generated by picture ranging system, is displayed directly with picosecond resolution. A laser pulse, for example, is made incident upon a scattering medium to produce a scattered form of the pulse which is viewed by the naked eye, a camera or other display device through an optical gate which functions as a camera shutter having an extremely short framing time of the order of a few picoseconds or less. The optical gate utilizes a material in which birefringence is optically induced by an optical control pulse of high intensity and picosecond duration. Other applications, including optical read-out of computer memories formed by stacks of photographs or holograms, are described.

BACKGROUND OF THE INVENTION

This invention relates to the direct display of light images with picosecond resolution and, more particularly, to the direct display with picosecond resolution of optical pulses of picosecond duration.

Developments in the laser art extending over the last decade have made it possible to generate optical pulses of picosecond duration by the utilization of several techniques including longitudinal mode locking and stimulated Raman emission. Pulses of such short duration are ideally suited to serve as the carrier in an optical pulse code modulation system or as a ranging signal in an optical radar system. For obvious reasons, therefore, it is desirable to be able to display such pulses in order to detect its presence or absence, to measure its amplitude and duration or, in optical radar applications to detect the shape and range of a target.

In general, the workers in the art have resorted to several indirect methods of displaying picosecond optical pulses. One of the earliest methods employed to measure the duration of picosecond pulses was a coincidence technique utilizing electrooptic crystals that generate as an output the sum and difference frequencies of two coincident signal inputs. To detect a pulse from a phase-locked laser, for example, the pulse is split into two signals which are passed simultaneously through the crystal. The output of the crystal is detected. By inserting a variable time-delay into the path of one of the signals, the output can be reduced to zero. The amount of delay inserted is then an indirect measure of the pulse width. However, the measurements cannot be accurately made from a single pulse, rather many pulses are required to properly adjust the delay and reduce the output to zero.

In 1967, however, the aforementioned delay technique was virtually completely replaced by another indirect method of display utilizing a two-photon fluorescent medium, such as 1,2,5,6-dibenzanthracene dissolved in benzene. As described in U.S. Pat. 3,453,429 issued to me, J. A. Giodmanine and P. M. Rentzepis on July 1, 1969, a picosecond optical pulse is made to overlap itself within the medium to produce a fluorescent spot the intensity and length of which are proportional to the amplitude and duration of the picosecond pulse. A further improvement in this technique utilizing a two-frequency, two-intensity scheme to eliminate the background trace produced in the former method, and thereby increase the contrast ratio, is also described by the same inventors in our copending patent application Ser. No. 668,052 (Case 4-12-9) filed on Sept. 15, 1967, and assigned to the assignee hereof.

Each of the foregoing techniques is properly characterized as indirect—in the delay technique the amount of delay inserted is an indirect measure of pulse width; in the two-photon fluorescent techniques the fluorescent spot provides an indirect measure of pulse width and amplitude. To date no one has been able to display directly short duration picosecond pulses. Some insight into the failure of the prior art workers to solve this problem notwithstanding the obvious need can be obtained when one realizes that in the early stages of the development of the laser art optical pulses were typically about one hundred nanoseconds in duration. The fact that the length in space of such a pulse is of the order of ten meters (about 33 feet) rendered it totally impractical to display such a large "object" on a screen or in hard copy such as photographic film. The advent of picosecond pulses, which are only about a tenth of a centimeter long in space, did little, however, to ameliorate the problem of the worker struggling in the laser arts. While a picosecond pulse was small enough to display practically, there was not available a device with fast enough rise time to respond to such a fast "event." Any attempt to photograph picosecond pulses directly utilizing for a shutter the slower, prior art optical gates (such as an electrooptic Pockels cell or D. C. Kerr cell which are driven by an electronic pulse generator) would result in an unsatisfactory image resembling a streak, i.e., an elongated tube of light containing no information as to the details of the actual pulse producing the streak. Consequently, with such a limited rise time optical gate it has been impossible to "stop" a picosecond pulse in mid-flight (i.e., stop-action photography), and, of course, it has not been possible to display such pulses with picosecond resolution.

It is therefore an object of the present invention to display directly picosecond optical pulses with picosecond resolution.

It is another object of this invention to display on hard copy such pulses.

It is yet another object of this invention to be able to view with the naked eye such pulses.

It is still another object of this invention to display with picosecond resolution an echo-form of a picosecond optical pulse after it has been scattered by a target and to determine thereby both the shape and range of said target.

It is another object of the present invention to read out information stored in a memory in the form of photographs or holograms.

SUMMARY OF THE INVENTION

My invention teaches an approach fundamentally different from the aforementioned prior art techniques. I treat a packet of visible light as a colored object, albeit a highly relativistic object, which can be examined in great detail if one looks at it from behind a sufficiently fast shutter. With this approach, a form of ultrafast photography, I have been able to display directly picosecond optical pulses in which I utilized as a camera shutter an optical gate having a framing time of about ten picoseconds or less. The gate, which was disposed between a light scattering medium and a photographic film, utilized a material in which birefringence was optically induced by means of a picosecond duration, high intensity control pulse, the material being disposed between a pair of crossed polarizers. A picosecond signal pulse to be displayed was made incident upon the scattering medium which produced a scattered form of the pulse, termed an echo pulse. The echo pulse was made incident upon one of the polarizers and was then transmitted through the material coincident with the optical control pulse which induced birefringence in the material, thereby causing the polarization of the echo pulse to be changed, preferably by 90°, and the echo pulse to be transmitted through the second polarizer to expose a photographic film, (i.e., the shutter was open). In the absence of the control pulse no birefringence was induced in the material, hence the echo pulse was absorbed by the second polarizer and the photographic film was not exposed (i.e., the shutter was closed).

When developed, the film displayed an eye-shaped image of the picosecond signal pulse. In fact, with the camera removed, I was able to view through the shutter, with my naked eye, the signal pulse "suspended" (i.e., stationary) in the scattering medium. Using these techniques it is of course apparent that pulses traveling in two or three dimensions can readily be displayed or viewed.

Materials useful in practicing my invention include both solids (e.g., germanium, glass), which have intrinsic rise times of the order of $10^{-15}$ seconds, and liquids (e.g., carbon disulphide), which have rise times of the order of a pisosecond; but the framing time (i.e., the length of time the optical gate is open) appears to be limited by the duration of the optical control pulse which may be of the order of a picosecond or less. Thus, without more, in the present invention the framing time is limited either by the rise time of the material or the width of the control pulse, whichever is greater. One skilled in the art will realize, of course, that group velocity mismatch between the control and echo pulses will also increase the framing time. However, this effect can be reduced by decreasing the length of gate material or by reducing the optical frequency difference between the control and echo pulses.

My display technique also finds ready application in a picture ranging system (e.g., optical radar or optical "X-ray"). In an optical radar system, for example, a picosecond optical illumination pulse is transmitted into space in the direction of suspected targets, such as airplanes and the like. The illumination pulse is scattered by the target to form an echo pulse, with picosecond resolution, which is detected and displayed using an optical gate as described above. The range of the target is measured by the time required for the echo pulse to return. This type of radar has the distinct advantage over conventional electronic radar of being able not only to range a target with fractional mil accuracy over many miles, but also to display its shape with picosecond resolution as contrasted with the simple "blip" produced on a conventional radar scope.

Similarly, directing the illumination pulse at hidden portions of the human body such as organs or bones, enables such portions to be displayed with high resolution as described above.

Other applications of my invention described hereinafter include for example, nondestructive optical read-out of memories formed by stacks of photographs, holograms and the like.

BRIEF DESCRIPTION OF THE DRAWING

These, for example, and other objects of the invention, together with its various features and advantages, can be more easily understood from the following more detailed description taken in conjunction with the accompanying drawing, in which:

FIG. 2A is a schematic of an optical radar system in accordance with another embodiment of my invention;

FIGS. 2B, 2C and 2D are schematics of sequential displays produced by the system of FIG. 2A.

FIG. 3 is a schematic of an optical read-out system for computer memories in accordance with another embodiment of the invention.

DETAILED DESCRIPTION

Figure 1:
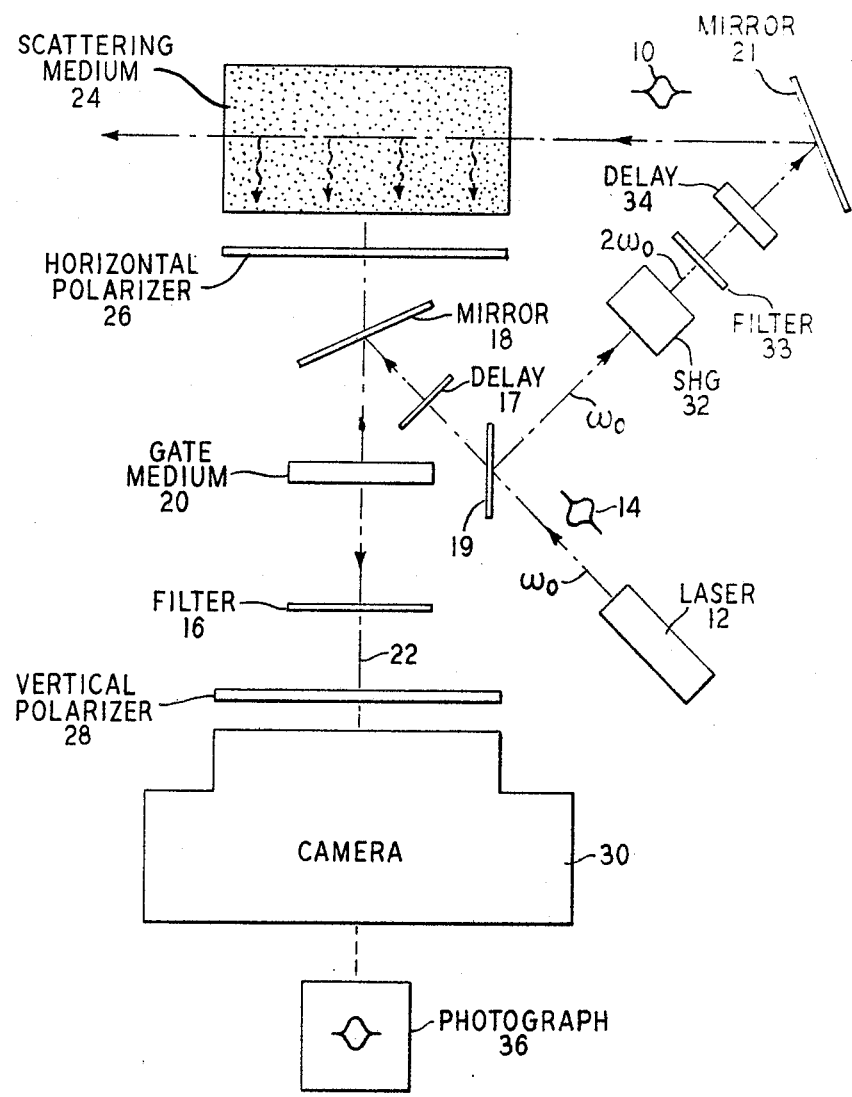
FIG. 1 is a schematic of apparatus utilized in photographing picosecond pulses in accordance with one embodiment of the invention.

Turning now to FIG. 1, there is shown, in accordance with an illustrative embodiment of my invention, apparatus for displaying directly a picosecond optical signal pulse 10. The apparatus includes a laser 12 which generates a high-intensity (e.g., 20 gigawatts/cm.$^2$) plane polarized optical control pulse 14 at frequency $\omega_0$ which is split into two components by beam splitter 19, one of which is reflected by mirror 18 (tilted with respect to optic axis 22) so as to be transmitted through gate medium 20. Mirror 18 is preferably of the dielectric variety which is highly reflective at $\omega_0$ and highly transmissive at other frequencies, especially $2\omega_0$. Aligned along the common axis 22 are a scattering medium 24, a pair of crossed polarizers 26 and 28, between which are disposed mirror 18, gate medium 20, and a filter 16 which absorbs energy at $\omega_0$ but transmits energy at other frequencies. A camera 30, or other recording or display device (e.g., the naked humane eye), is located behind polarizer 28. Polarizers 26 and 28 and gate medium 20 function as an ultrafast shutter for the camera, i.e., in the absence of a control pulse incident on gate medium 20, the shutter is closed, whereas in the presence of such a pulse the shutter is open.

The other component produced by beam splitter 19 constitutes the signal pulse to be displayed and is passed through a second harmonic generator (SHG 32) which produces an optical pulse at optical frequency $2\omega_0$, preferably in the visible part of the spectrum. The output of SHG 32 is first passed through a filter 33 which blocks the fundamental $\omega_0$ and is then reflected by mirror 21 into scattering medium 24. Delay elements 17 and 34 are adjusted so that signal pulse 10 is present in scattering medium 24 at approximately the same time that the control pulse 14 is passing through gate medium 20. Under such circumstances, the signal pulse is scattered by medium 24 in a direction along optic axis 22, thereby exposing the film in camera 30 and producing, when developed, a photograph 36 showing an eye-shaped image of signal pulse 10.

In effect, therefore, my display technique has "stopped" the pulse, making it appear to be suspended in the scattering medium to the extent even that the pulse can be seen with the naked eye when looking through polarizer 28.

In an illustrative case which I successfully constructed and operated, a mode locked Nd:glass laser generated plane polarized control pulses of about 8 psec. duration at 10 nanosecond intervals. These pulses had a wavelength of 1.06 $\mu$m. and a peak power of about 22 gigawatts/cm.$^2$. Signal pulses about 6 psec. in duration were produced by passing the control pulses through a KDP crystal set at the phase matching angle (about 53°) to generate green light at 0.53 $\mu$m. and about 0.2 gigawatt/cm.$^2$. The green signal pulses, appropriately delayed in time by means well known in the art, were passed through a colloidal dispersion (e.g., milky water) and coincident therewith the infrared control pulses were made incident upon the gate medium which consisted of a cylindrical carbon disulphide cell 2 cm. in diameter and 1 cm. long (in the direction of propagation). Each control pulse opened the shutter for about 10 picoseconds thereby producing a green image of a corresponding signal pulse on the photographic film. It will be readily appreciated, of course, that to display generally an "unknown" picosecond signal pulse, it may be desirable to use a separate control pulse laser which generates pulses of known shape and duration (preferably in the subpicosecond range to increase resolution).

Before discussing in detail other embodiments of my invention, a discussion of the optical gate which I employ as an ultrafast shutter will be presented. As mentioned previously the shutter comprises a gate medium disposed between a pair of crossed polarizers. In practice, however, the gate medium need be used with only a single polarizer if the signal being gated is already polarized. In either case, a high intensity (e.g., 20 gigawatts/cm.$^2$), plane polarized control pulse passes through the gate medium and optically induces therein changes in its refractive index. These changes, as will be described hereinafter, affect the polarization of a second, usually less intense (e.g., 100 times smaller), optical signal pulse which is also transmitted through the gate medium. The latter signal constitutes the signal to be gated. The Refractive Index change for signal pulse light polarized parallel to the electrical field of the control pulse in general differs from the Refractive Index change for light polarized normal to this field. The resulting birefringence, or net change in index of refraction between the changes in the parallel and normal directions, is proportional to the product of the nonlinear index of the gate medium and the square of the peak electrical field of the control pulse.

By way of illustration, a picosecond optical control pulse having a peak power density of 22 gigawatts/cm.$^2$, which corresponds to a peak optical field of $4.07 \times 10^6$ volts/cm., induces in glass, having a nonlinear index of about $2 \times 10^{-13}$ electrostatic units, a birefringence of about $1.84 \times 10^{-5}$, which is considerable. Of course, materials with a higher nonlinear index, such as those listed below, will have even greater birefringence.

The following Table I lists the approximate nonlinear indices and passbands of a group of gate media particularly useful in accordance with the teachings of this invention. Each of these materials has an intrinsic rise time of about $10^{-15}$ seconds, except carbon disulphide and carbon tetrachloride which have respective rise times of about 2.0 psec. and 0.5 psec.

TABLE I

| Gate medium | Nonlinear index, ($\times 10^{-13}$ esu.) | Passband (microns) |
| --- | --- | --- |
| Carbon disulphide | 200 | 0.3–5 |
| Carbon tetrachloride | 4 | 0.3–5 |
| Germanium | 8,000 | 1.8–23 |
| Silicon | 2,500 | 1.2–15 |
| Gallium arsenide | 2,500 | 1.0–15 |
| Diamond | 600 | 0.25–80 |
| Strontium titanate | 600 | 0.4–6 |
| Cuprous chloride | 30 | 0.5–11 |
| Glass (heavy flint) | 30 | 0.4–4 |
| Fused quartz | 2 | 0.12–4.5 |
| Glass (BK–7) | 2 | 0.37–3.5 |

The passband of $CS_2$ includes in addition a 1–2 $\mu$m. hole centered at about 10.6 $\mu$m. In the case of solid media high purity, single crystals free of substantial strain birefringence are preferred.

It should be noted here that the polarization of the signal pulse is technically not rotated, rather it changes continuously from vertical to elliptical (in which the major axis of the ellipse is vertical), to circular, to elliptical (in which the major axis of the ellipse is horizontal) and finally to horizontal, thereby effecting a 90° change in the polarization. To maximize this change in polarization it is preferable that the polarization of the control pulse be at 45° to the polarization of the signal pulse. Moreover, to effect the preferred 90° change in polarization, it is desirable that the signal pulse intensity be considerably less intense than the control pulse intensity so that the signal pulses induce only a negligible amount of birefringence in the gate medium. In addition, since the phase retardation in a given gate medium is proportional to the product of the length of the medium in the direction of light propagation and the power density, these parameters are chosen to produce the desired 90° change in polarization. For example, in glass (BK–7), the length is about 1.84 cm. for a control pulse peak power density of about 22 gigawatts/cm.$^2$ (at about 1.06$\mu$) and a signal pulse peak power density of about 0.2 gigawatt/cm.$^2$ (at 0.53$\mu$). Typically, the glass body is 1 centimeter square in cross section.

In the absence of a control pulse applied to medium 20 the scattered portion of signal pulse 10 is horizontally polarized by polarizer 26, is unaffected by medium 20 and ultimately is not transmitted through vertical polarizer 28. As a consequence, film 36 in camera 30 is unexposed. The presence of a control pulse, however, rotates the polarization of the signal pulse as it passes through medium 20 thereby permitting it to be passed through vertical polarizer 28 to camera 30.

The width of the control pulse, typically in the picosecond range, essentially dictates the framing time of the optical gate as a whole. Thus, a control pulse of 1.0 picosecond duration applied to a glass gate medium produces a framing time of about 1.0 picosecond. On the other hand, the same control pulse applied to $CS_2$ would produce a framing time of about 2.0 pisoseconds due to the longer relaxation time of $CS_2$ (see Table I).

Turning now to several other embodiments of my ultrafast shutter, there is shown in FIG. 2A a picture ranging system, illustratively an optical radar system. It will become apparent, however, to those skilled in the art from the following description that this system can be readily used as a form of optical X-ray to view, for example, the bones or organs of the human body, or alternatively as a means of ranging objects (e.g., fish) lying at selected depths beneath the surface of the ocean.

The optical radar system includes a laser 50 which generates a pisosecond illumination pulse 52 shown to be transmitted into space toward suspected targets such as jet airplane 54. The illumination pulse is scattered by the target and produces an echo signal 56, an optical image of the target airplane with picosecond resolution. The echo signal is detected by an optical receiver which includes a picosecond shutter 58 of the type previously described which is opened and closed by a train high intensity, picosecond duration control pulses generated by laster 60. Each opening of the shutter permits a transverse "slice" of the echo signal to be passed through the shutter and made incident upon a display (e.g., television) screen 62. By means well known in the art a counter 64 detects the time at which the illumination pulse is transmitted and the time at which the echo pulse is received, and produces therefrom with fractional mil accuracy the range of the approaching target 54.

As shown in FIGS. 2B–2D, the image viewed is that of successive transverse "slices" of the target. For the approaching aircraft 54, the display screen 62 depicts at time $t = t_1$ the nose 66 of the jet at range 50.3127 units of distance (FIG. 1); at time $t = t_2$ the nose 66 and cockpit 68 are seen at range 50.3126 and at a later time $t = t_3$, the nose 66, cockpit 68 and wings 70 are viewed at range 50.3125. Thus, my optical radar system produces not only an accurate measure of the range of a target but also an image thereof with picosecond resolution. In contrast, the "blip" seen on a conventional radar scope conveys little information as to the detailed shape of a target and is able to measure its range to meter accuracy only.

Another embodiment of my invention, a readout system for optical computer memories, is shown in FIG. 3. The memory banks consists of a plurality of stacks 80 of photographs, holograms or the like to which access is obtained through a gate comprising in optical series a gate medium 82 and a Glan-Thomson or Nicol prism 84 or the equivalent. The gate medium 82 is controlled via a control pulse 102 produced by laser 88. The stacks are interrogated by means of a vertically (or horizontally) polarized picosecond illumination pulse 88, generated by laser 90. The interrogate pulse is passed through polarizer 89 and reflected from beam splitter 92 into the memory bank. The detector 105 which receives the readout images comprises an optical shutter 94 (as previously described) controlled by pulses 103 from laser 96. Images passed through the shutter 94 are focused by a lens system (shown schematically as a single lens 98) onto a detector array 106 (e.g., an array of photodiodes).

In operation, assume that it is desired to read out the information contained in hologram H12 of stack S25. Interrogate pulse 88 passes through the gates of all preceding stacks since no control pulse is applied to the gate media thereof. However, by timing means well known in art, a control pulse 102 from laser 86 is made to be coincident in gate medium 82 with the passage therethrough of the interrogate pulse. Consequently, the polarization of the latter pulse is rotated from vertical to horizontal causing it to be reflected at ninety degrees by prism 84. The reflected interrogate pulse is thereby scattered by each of the holograms of stack S25. The scattered or echo signals are transmitted back through each of the gates toward the detector 105. Since the relative distances of all components is known, the echo signal for hologram H12 is detected by array 106 by opening shutter 94 via control pulse 103 as the corresponding echo signal reaches the shutter. In a similar way all of the other holograms can be read out. It should be noted, however, that to be able to distinguish between echo signals produced by adjacent holograms (or photographs) in the same stack, it is preferable that the distance between such adjacent holograms be at least as great as the product of the framing time of shutter 94 and the speed of light. The maximum access time is measured approximately by twice the distance the interrogate pulse travels to the last hologram in the last stack (e.g., if this distance were 15 cm., the maximum access time would be about 1.0 nanosecond.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. A method of displaying directly an image with picosecond resolution comprising the steps of
    making at least one optical signal incident upon a light scattering medium to produce an optical echo signal,
    making said echo signal incident upon an optical shutter which includes a gate medium in which birefringence can be optically induced, said shutter having a framing time of the order of a picosecond or less and at least one polarizer disposed on the side of said gate medium remote from the side on which said echo signal is made incident,
    coincident with the incidence of said echo signal on said gate medium, passing at least one optical control pulse of high intensity and picosecond duration or less through said gate medium to optically induce birefringence therein, and
    displaying said echo signal after it passes through said shutter.

2. The method of claim 1 including the step of polarizing said control pulse at an angle measured in said gate medium of about 45° to the polarization of said echo signal.

3. The method of claim 1 wherein said optical signal comprises at least one pulse of picosecond duration and of frequency in the visible portion of the spectrum, said scattering medium comprises a colloidal dispersion and said echo signal is displayed by exposing photographic film.

4. The method of claim 1 wherein said optical signal comprises at least one pulse of picosecond duration and of frequency in a nonvisible portion of the spectrum and including the additional step of translating the frequency of said optical signal to a visible portion of the spectrum, and wherein said scattering medium comprises a colloidal dispersion and said echo signal is displayed by exposing photographic film.

5. The method of claim 1 for use in ranging targets wherein said scattering medium comprises said target, said optical signal is a pulse of picosecond duration or less, said echo signal is an image of said target with picosecond resolution or less, and a plurality of sequential control pulses are applied to said gate medium to open said optical shutter at sequential intervals to produce sequential images of successive transverse sections of said target.

6. The method of claim 5 including the further step of measuring the difference in time between the transmission of said optical signal and the reception of said echo signal, thereby to obtain a measure of the range of said target with fractional mil accuracy.

7. The method of claim 1 for reading out optical information from an optical memory in which said scattering medium comprises at least one stack containing a plurality of uniformly spaced light scattering memory elements, and wherein said optical signal is an optical pulse of picosecond duration or less made incident upon said elements to produce from each of said elements an echo signal, said control signal being a control pulse of picosecond duration or less applied to said gate medium at a time corresponding to the arrival thereat of the echo signal from a preselected one of said elements, and wherein the uniform separation of said elements is at least as great as the product of said framing time and the speed of light.

8. The method of claim 7 wherein said memory elements comprise holograms.

9. Apparatus for displaying directly images with picosecond resolution comprising
    a light scattering medium upon which an optical signal is made incident to produce an optical echo signal,
    an optical shutter having a framing time of the order of a picosecond or less and being disposed in the path of said echo signal comprising a pair of crossed polarizers, a gate medium disposed between said polarizers and characterized by the property that birefringence can be optically induced therein, said echo signal being transmitted through at least one of said polarizers and said gate medium,
    means for applying to said gate medium, coincident with the passage therethrough of said echo signal, an optical control pulse of high intensity and picosecond duration or less to induce therein birefringence, thereby to open said shutter and to permit said echo signal to pass through the other of said polarizers, and
    means disposed to display said second signal after it passes through said second polarizer.

10. The apparatus of claim 9 wherein said echo signal after passage through said one polarizer is polarized in a first direction and said control pulse is polarized at an angle of about 45° to said first direction.

11. The apparatus of claim 10 wherein said optical signal comprises at least one optical pulse of picosecond duration or less, said scattering medium comprises a colloidal dispersion, said echo signal is of frequency in the visible part of the spectrum and said display means comprises a photographic film.

12. The apparatus of claim 10 wherein said gate medium is adapted to rotate the polarization of said echo signal from said first direction to a second direction at approximately 90° to said first direction.

13. Optical apparatus comprising
at least one stack of optical memory elements uniformly spaced along a common optic axis,
means for transmitting in one direction along said axis an optical interrogation pulse of picosecond duration or less, thereby to produce from each of said elements an echo pulse traveling in the opposite direction along said axis,
an optical shutter having a framing time of the order of a picosecond or less disposed in the path of said echo pulses for passing selected ones of said echo pulses, and
means for detecting said selectively passed echo pulses, thereby to retrieve the information contained in the corresponding memory element,
said shutter comprising a first gate medium in which birefringence can be optically induced and at least one polarizer disposed on the side of said first gate medium remote from the side on which said echo pulses are incident,
means for making an optical control pulse of high intensity and picosecond duration or less incident upon said gate medium coincident with the incidence thereon of said selected echo pulses.

14. The apparatus of claim 13 including a plurality of said stacks each disposed along separate parallel axes perpendicular to a common interrogate axis, said interrogate pulse being transmitted along said interrogate axis, and in combination with switching means disposed at each of the intersections of said parallel axes with said interrogate axis for causing said interrogate pulse to be transmitted along selected one of said parallel axes, thereby to produce echo signals from said memory elements in the stack disposed on the selected axis.

15. The apparatus of claim 14 in combination with means for polarizing said interrogate signal in a first direction normal to the direction of said one polarizer of said shutter, and wherein each of said switching means comprises a second one of said gate media disposed on said interrogate axis, means for applying to selected ones of said second gate media an optical control pulse of picosecond duration and high intensity to rotate the polarization of said interrogate pulse, and means responsive to said rotated polarization to cause said interrogate pulse to be transmitted along the selected parallel axis.

16. The apparatus of claim 15 wherein said responsive means comprises a member selected from the group consisting of a Glan-Thomson prism and a Nicol prism.

17. The apparatus of claim 16 wherein said control pulses are polarized at an angle of 45° the polarization of said interrogate pulses.

18. The apparatus of claim 17 wherein said memory elements comprise holograms.

References Cited

UNITED STATES PATENTS

| | | | |
|---|---|---|---|
| 3,403,261 | 9/1968 | Bowers et al. | 250—225 |
| 3,380,358 | 4/1968 | Neumann | 356—5 |
| 3,153,146 | 10/1964 | Lady | 350—157 |
| 3,519,328 | 7/1970 | Grossman | 350—160 |
| 3,521,070 | 7/1970 | Duguay et al. | 350—160 |

BENJAMIN A. BORCHELT, Primary Examiner

S. BUCZINSKI, Assistant Examiner

U.S. Cl. X.R.

250—199, 225; 350—150, 157, 160 R